United States Patent
Poudes et al.

(10) Patent No.: US 10,110,350 B2
(45) Date of Patent: Oct. 23, 2018

(54) METHOD AND SYSTEM FOR FLOW CONTROL

(71) Applicant: BULL SAS, Les Clayes Sous Bois (FR)

(72) Inventors: Axel Poudes, Paris (FR); Ghassan Chehaibar, Guyancourt (FR); Sylvie Lesmanne, Les Clayes Sous Bois (FR)

(73) Assignee: Bull SAS, Les Clayes Sous Bois (FR)

( * ) Notice: Subject to any disclaimer, the term of this patent is extended or adjusted under 35 U.S.C. 154(b) by 29 days.

(21) Appl. No.: 15/316,355

(22) PCT Filed: May 21, 2015

(86) PCT No.: PCT/FR2015/051343
§ 371 (c)(1),
(2) Date: Dec. 5, 2016

(87) PCT Pub. No.: WO2015/185824
PCT Pub. Date: Dec. 10, 2015

(65) Prior Publication Data
US 2017/0163386 A1 Jun. 8, 2017

(30) Foreign Application Priority Data
Jun. 6, 2014 (FR) .................................. 14 55147

(51) Int. Cl.
*H04L 1/16* (2006.01)
*H04L 1/18* (2006.01)
(Continued)

(52) U.S. Cl.
CPC .......... *H04L 1/1642* (2013.01); *H04L 1/1685* (2013.01); *H04L 1/1838* (2013.01);
(Continued)

(58) Field of Classification Search
CPC ... H04L 1/1838; H04L 1/1642; H04L 1/1809; H04L 1/1825; H04L 1/1685; H04L 12/1868
(Continued)

(56) References Cited

U.S. PATENT DOCUMENTS

| 5,754,754 A | 5/1998 | Dudley et al. |
| 8,245,093 B2 * | 8/2012 | Kim .................. H04L 1/165 370/392 |

(Continued)

FOREIGN PATENT DOCUMENTS

WO 2004/023736 A1 3/2004

OTHER PUBLICATIONS

Andrew S. Tanenbaum, "Computers Networks; Section 4.4. Sliding Window Protocols", Jan. 1, 1988, XP-002737806, pp. 223-239.
(Continued)

*Primary Examiner* — James C Kerveros
(74) *Attorney, Agent, or Firm* — Sughrue Mion, PLLC

(57) ABSTRACT

Managing the end-to-end reliability in the delivery with acknowledgment of data from a source node (10) to a group of destination nodes (21-23), including the steps of marking messages (1) transmitted from the source node (10); upon transmission of a message, incrementation of an overall sequence number; identification of the overall sequence number of a message transmitted by which the source node has not received an acknowledgment; and calculation of the difference between the overall sequence number of the next message to be transmitted and the identified overall sequence number. If the calculated difference is equal to a predefined threshold, suspend the transmission of messages from the source node (10) to the group of destination nodes (21-23) and conclude the presence of an error in the delivery of data.

16 Claims, 1 Drawing Sheet

(51) Int. Cl.
  *H04L 12/801* (2013.01)
  *H04L 12/18* (2006.01)
(52) U.S. Cl.
  CPC .......... *H04L 12/1868* (2013.01); *H04L 47/34* (2013.01); *H05K 999/99* (2013.01)
(58) Field of Classification Search
  USPC .................................. 718/748, 750; 370/235
  See application file for complete search history.

(56) References Cited

U.S. PATENT DOCUMENTS

| | | | | |
|---|---|---|---|---|
| RE45,407 E | * | 3/2015 | Gerendai | H04L 1/1628 714/748 |
| 2005/0036452 A1 | * | 2/2005 | Banerjee | H04L 1/0061 370/252 |
| 2006/0154603 A1 | * | 7/2006 | Sachs | H04L 1/1635 455/39 |
| 2008/0225842 A1 | * | 9/2008 | Goldfein | H04L 1/1825 370/389 |
| 2010/0017675 A1 | * | 1/2010 | Ihm | H04L 1/0656 714/751 |
| 2010/0046520 A1 | * | 2/2010 | Nakata | H04L 1/1867 370/394 |
| 2012/0084616 A1 | * | 4/2012 | Wentink | H04L 1/1614 714/748 |
| 2014/0269461 A1 | * | 9/2014 | Mehta | H04L 5/06 370/297 |
| 2015/0288487 A1 | * | 10/2015 | Chan | H04L 12/4633 370/235 |

OTHER PUBLICATIONS

International Search Report dated Aug. 31, 2015, issued by the International Searching Authority in application No. PCT/FR2015/051343.

* cited by examiner

METHOD AND SYSTEM FOR FLOW CONTROL

CROSS REFERENCE TO RELATED APPLICATIONS

This application is a National Stage of International Application No. PCT/FR2015/051343, filed on May 21, 2015, which claims priority from French Patent Application No. 1455147, filed on Jun. 6, 2014, the contents of all of which are incorporated herein by reference in their entirety.

The present invention concerns the techniques of end-to-end flow control between communicating nodes in a packet communications network, and more particularly the optimal implementation of an end-to-end reliability mechanism in the delivery of data.

"End-to-end reliability" is understood here as being the guarantee of end-to-end delivery of messages sent from a source node to one or more destination nodes.

In the course of a communication involving a plurality of nodes in a packet communications network, various errors can occur, such as corruption of packets, packets out of order, loss or duplication of packets. Consequently, there are different end-to-end reliability mechanisms, such as, in particular, the addition of an end-to-end sequence number by the source node to each message transmitted so that the loss of a message can be detected by the destination node by noting a skip in the sequence numbers of messages received;

storing a copy of every message transmitted in a memory at the source node, for the purpose of its future retransmission in the event of error; and methods of detecting said errors, generally implemented in the end nodes (source node and destination node) of a connection-oriented link implementing a transmission protocol with acknowledgment.

Indeed, in a solution based on the sequencing of packets utilizing an end-to-end sequence number, each source-destination pair has a dedicated end-to-end sequence number (one in each direction). The end-to-end sequence number of a given pair is incremented by one each time a new message is sent between said two nodes. Thus, for each source node, the destination node verifies that the packets received contain successive sequence numbers.

This solution has the disadvantage of adding a memory to the source node and to the destination node, respectively, in order to store:

the next end-to-end sequence number to be used for each of the nodes viewed, by said node, as destination nodes;

the next end-to-end sequence number expected for each of the nodes viewed, by said node, as source nodes.

Moreover, the number of sequence numbers must be multiplied by the number of virtual networks used. For example, to guarantee sequencing in a network of 65,536 nodes in 4 virtual networks, 2 (transmission/reception)×65,536 (number of nodes)×4 (number of virtual networks) end-to-end sequence numbers must be stored per node. In this case, with a sequence number of 16 bits (plus 6 bits to add an error correction code), a memory of 524,288 entries of 22 bits, or 11,264 kB, is required. The allocation of that much memory space at each source node and each destination node of the network is very costly in resources, and impacts the performance of the network in proportion to its size.

In the event of error in the transmitted data (corruption of data, delivery out of order, or lost packet, for example), the destination node informs the source node by sending a non-acknowledgment-type response, specifying the type of error encountered. The source node then proceeds to retransmit the packet or packets concerned.

To do this, the source node stores a copy of all messages it transmits in a retransmission memory. When it receives a positive acknowledgment, the source node can delete the corresponding message from the retransmission memory. However, when it receives a negative acknowledgment (i.e., non-acknowledgment) or it does not receive a response message for a certain message sent to a destination node, the source node proceeds to retransmit it, and perhaps to retransmit the following messages to the same destination node. Indeed, in the case of sequenced traffic, the destination node refuses all packets following an erroneous packet because verification of the end-to-end sequence number is then erroneous until the first erroneous message is retransmitted and received error-free by the destination node.

A disadvantage of said retransmission of data is the inconvenience of its implementation. Indeed, the source node must retransmit the message in error as well as all subsequent messages to the destination node that has detected the error, and to that recipient only. However, because the messages sent to the different destination nodes are stored in a same retransmission memory (because one retransmission memory per destination node is impracticable), it is necessary to scan this retransmission memory to identify and retransmit only the messages required by the destination node that detected the error. This certainly affects the performance of the end-to-end reliability mechanism.

Furthermore, it is possible for the acknowledgment message to be lost even though the respective message has arrived at the destination node. In this case, the source node retransmits this message and requests the retransmission of an acknowledgment message, which results in a duplication of the message at the destination node. Message duplication can also occur in the event of heavy congestion of the network, slowing the transmitted message or its acknowledgment so that the source node retransmits this message, assuming that it has been lost. This results in the destination node receiving the same message twice.

In order to distinguish a duplicate message from a lost message, it is generally required that the maximum possible value of the end-to-end sequence number be far higher than twice the number of messages that a source node can send during a period of time equal to the sum of the timeout and the worst propagation time between said source node and a destination node. The timeout is an RTO (Retransmission Timeout) activated by the source node when a data packet is sent, and at the end of which the acknowledgment of receipt of said packet is expected.

In this instance, for a source node that can send one hundred twenty-five million packets per second;

a timeout of four seconds; and a worst propagation time between a source node and a destination node on the order of one second (for a very congested network), the maximum possible value of the end-to-end sequence number should be far higher than one billion, two hundred fifty million. It therefore must be coded on at least 35 bits. In other words, this adds an end-to-end sequence number of about 35 bits to each message sent. However, adding a sequence number of such a size represents a very costly overload, resulting in a considerable reduction of the usable bandwidth between the source node and the destination node(s). A 35-bit sequence number also increases the memory space needed for its storage at the nodes.

An object of the present invention is to remedy the aforementioned disadvantages.

Another object of the present invention is to reduce the complexity of implementing end-to-end flow control techniques, particularly in large-scale IP networks.

Another object of the present invention is to increase reliability in delivery of data in IP networks.

Another object of the present invention is to propose an end-to-end protection method that makes it possible to guarantee the reliability of a large-scale network while limiting:

the memory space required;
the impact on performance of the network (particularly the number of messages processed per second or the usable bandwidth).

To those ends, according to a first aspect, the invention proposes a method for managing the end-to-end reliability in the delivery with acknowledgment of data from a source node to a group of destination nodes in a communications network, the group of destination nodes including at least one first destination node, said method comprising the following steps:

marking messages transmitted from the source node to said first destination node by an incremental end-to-end sequence number so that, following a first message received from said source node, said first destination node awaits the receipt of a second message marked by an expected end-to-end sequence number from said source node;

upon transmission of a message from the source node to a destination node included in the group of destination nodes, incrementation of an overall sequence number, said overall sequence number being able to be incremented up to a predefined maximum value;

identification of the overall sequence number of a message transmitted from the source node to a destination node included in the group of destination nodes and for which the source node has not received an acknowledgment;

calculation of the difference between the overall sequence number of the next message to be transmitted from the source node to a destination node included in the group of destination nodes and the identified overall sequence number;

if the calculated difference is equal to a predefined threshold, suspension of the transmission of messages from the source node to the group of destination nodes;

following said suspension, if the end-to-end sequence number marking a message received by said first destination node coming from said source node is different from said expected end-to-end sequence number, conclusion by said first destination node that there is an error in the delivery of data.

According to various embodiments, the method has the following characteristics, which may be combined:

if the end-to-end sequence number marking a message received is higher than the expected end-to-end sequence number, the error is a lost message;

if the end-to-end the sequence number marking a message received is lower than the expected end-to-end sequence number, the error is that the message received is a duplicate message;

the predefined threshold is the integer value of one-half of said predefined maximum value;

the overall sequence number is coded on sixteen bits;

the end-to-end sequence number is coded on sixteen bits.

Said method further comprising:

when the overall sequence number reaches said predefined maximum value, a step of initializing said overall sequence number;

a step of reading the end-to-end sequence number corresponding to said destination node, said number being stored in memory at said source node;

a step of incrementation by one of the end-to-end sequence number read;

a step of storing in memory the overall sequence number in a retransmission memory;

a step of storing in memory each message transmitted to said first destination node in a double-chained list, said double-chained list being stored in said retransmission memory and being associated with said first destination node.

According to a second aspect, the invention relates to a computer program product implemented on a storage medium, capable of being run on a data processing unit and comprising instructions for the implementation of the method summarized above.

Other objects and advantages of the invention will be seen from the description of embodiments, provided below with reference to the appended drawings in which.

Figure 1:
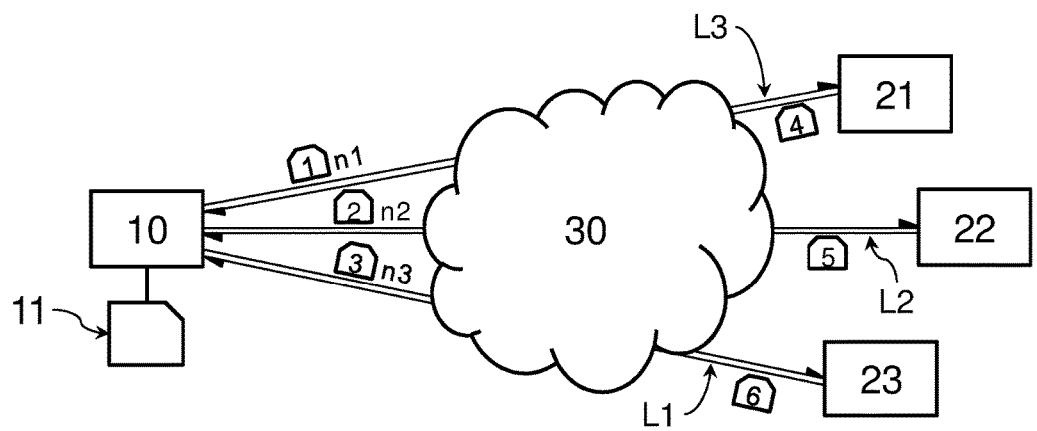
FIG. 1 illustrates one embodiment of delivery of data from a source node to a plurality of destination nodes.

With reference to FIG. 1, displayed is a source node 10 transmitting messages 1, 2, 3 to a plurality of destination nodes, respectively 21, 22, 23, which may or may not pertain to a same virtual network.

The source node 10 transmits messages 1, 2, 3 to the destination nodes 21, 22, 23 via the links L1, L2, L3 implementing a transmission protocol with acknowledgment 4-6.

In order to ensure a sequenced transmission of messages to each destination node 21-23, each message 1-3 is marked at the source node 10 by an end-to-end sequence number n1-n3, which represents the position of said message in the flow of sequenced messages coming from the source node 10 and intended for the respective destination node 21-23. In other words, the end-to-end sequence number n1 marking the message 1 represents the order of said message 1 in the set of messages sent by the source node 10 intended for the destination node 21. Thus, following a message received by a destination node 21, said node awaits the reception of a message from the source node 10, marked by an expected end-to-end sequence number (n1+1), which is successive to the end-to-end sequence number of the message received (n1).

The end-to-end sequence numbers n1-n3 are coded on 16 bits. Advantageously, the limitation of the size of the end-to-end sequence numbers n1-13 [sic: n3] to 16 bits represents a gain of 20 bits per message compared to the conventional methods where the size of an end-to-end sequence number is 32 bits.

Moreover, the sending of any message 1-3 by the source node 10 increments an overall sequence number N, which represents the position of said message in the overall sequenced flow of data sent by the source node 10 to the destination nodes 21-23. In other words, the overall sequence number of the message 2 is its order in all of the messages 1-3 sent by the source node 10 to a group of destination nodes 21-23.

In one embodiment, the overall sequence number N is coded on 16 bits, being of the same size as the end-to-end sequence number n1-n3. In this case, the overall sequence number N cannot take values above two to the sixteenth power minus one ($2^{16}-1$). The overall sequence number is cyclically incremented, i.e., it is initialized each time it reaches said maximum possible value Nmax (in other words, a circular overall sequence number, or an overall sequence number modulo Nmax).

The overall sequence number N is not transmitted with the messages 1-3 on the network 30, and is kept in a retransmission memory 11 associated with the source node 10.

It should be noted that more than one group of destination nodes 21-23 can be considered, in which case an overall sequence number N is defined for each group of destination nodes.

Figure 2:
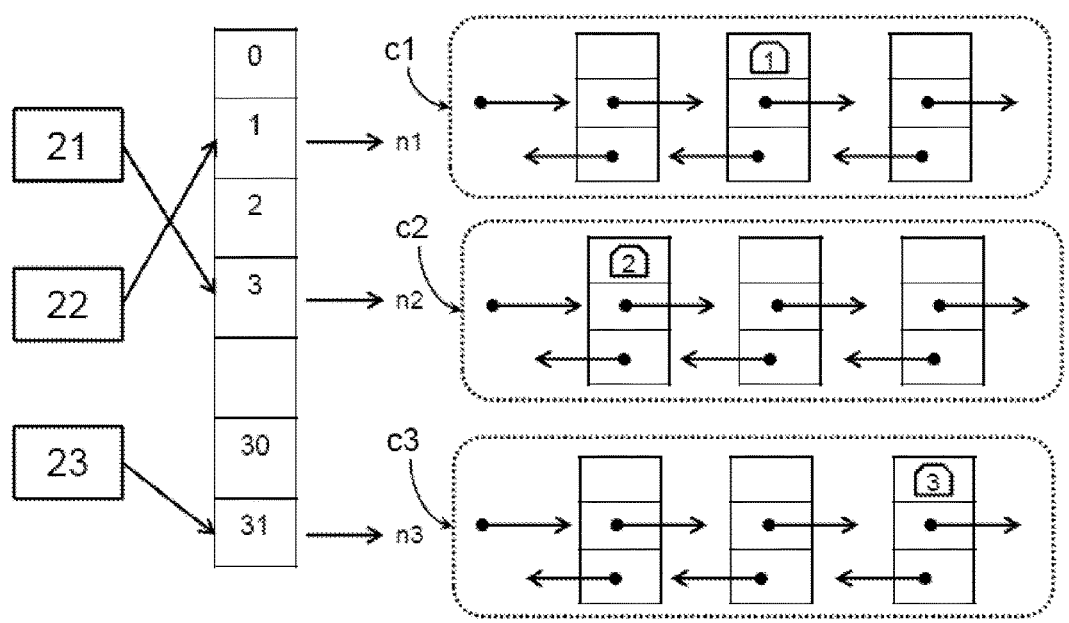
FIG. 2 illustrates a method of storage and access to data according to one embodiment.

With reference now to FIG. 2 (the elements similar to those described above have the same references), a hash table of predefined size (in this instance, 32) makes it possible to obtain, on the basis of the destination node 21-23, the end-to-end sequence number n1-n3 of the message 1-3. The destination node 21 is used here as being the key for the hash function to access a memory space at the source node 10, which comprises the end-to-end sequence number n1 to assign to the message 1. Thus, at the source node 10, a memory space is used to store the end-to-end sequence number n1-n3 of each destination node 21-23 (one entry per destination). Each time a message 1-3 is to be sent to a destination node 21-23, the end-to-end sequence number n1-n3 is obtained by reading the end-to-end sequence number stored in the corresponding memory space at the destination node 21-23. After each end-to-end sequence number n1-n3 is read, the end-to-end sequence number read is incremented by one. That is, the end-to-end sequence number that has just been read, for the transmission of the message 1-3 to the destination node 21-23, is incremented by one. Thus, the next message to be transmitted to said same destination node will have an end-to-end sequence number incremented by one.

In this instance, the end-to-end sequence number n1 is incremented by one for each message 1 addressed to the destination node 21, which is the key for accessing said end-to-end sequence number.

This sequence number n1 is incremented linearly with the number of messages 1 sent by the source node 10 to the destination node 21. Said sequence number n1 thus makes it possible to identify the message 1 addressed to the destination node 21 among all of the messages addressed to said destination node 21.

Preferably, a hash table is defined by a group of destination nodes 21-23.

Double-chained lists c1-c3, respectively, associated with the end-to-end sequence numbers n1-n3 (and therefore with each destination node 21-23) are configured, respectively, to store the messages 1-3 therein. A double-chained list comprises, for each message in the list, a pointer designating the following message, as well as a pointer designating the preceding message in the list concerned.

The double-chained lists c1-c3, comprising respectively the messages n1-n3, are stored in the retransmission memory 11. In other words, a copy of the messages 1-3 sent from the source node 10 is inserted in the double-chained lists c1-c3 based on their destination, respectively.

Advantageously, the result is that in the event of error on a sequenced message 1-3, the double-chained list c1-c3 prevents scanning all of the entries of the retransmission memory 11, and in particular, retransmitting to the destination node 21-23 concerned all of the messages following the message in error.

Furthermore, the use of the double-chained lists c1-c3 makes it possible to reduce the time of scanning the retransmission memory 11 when an error is detected that requires the resending of several messages to a destination node 21-23, without necessitating increasing the memory space of the retransmission memory.

In order to enable the detection of any error in the messages 1-3 addressed to the destination nodes 21-23, when the difference between the overall sequence number N of the oldest message 1-3 sent on the network 30 and for which no acknowledgment 4-5 (either positive or negative) has been received by the source node 10; and the overall sequence number N of the next message to be sent, for a given hash index (i.e., for a given destination node 21-23), is equal to a predefined threshold, then message transmission on the network 30 is suspended. In this way, if the end-to-end sequence number n1-n3 received is lower than the expected end-to-end sequence number, the destination node 21-23 concludes that the message received is a duplicate message. However, if the end-to-end sequence number n1-n3 of the message 1-3 received is higher than the expected end-to-end sequence number n1-n3, then the destination node 21-23 concludes that a message is lost.

In this way, the destination node 21-23 can easily distinguish a duplicate message from a lost message by a simple comparison between the expected end-to-end sequence number n1-n3 and the received end-to-end sequence number. The destination node 21-23 therefore has the responsibility of detecting errors (loss or duplication of message), and of requesting a retransmission of messages when it determines that to be necessary.

Preferably, the predefined threshold is equal to one-half the maximum possible value Nmax of the overall sequence number N, or more generally the integer value of one-half of the maximum possible value Nmax of the overall sequence number N.

Indeed, the end-to-end flow control uses a window of width Nmax/2 on the overall sequence numbers N and the upper limit of which is the overall sequence number N of the next message to be sent.

When the lower limit of said window corresponds to a message 1-3 for which no acknowledgment has been received by the source node 10, message transmission 1-3 on the network 30 is suspended until the resolution of said error in the delivery of data (namely, requiring the retransmission of the lost message or considering that the message received is a duplicate message).

With regard to the optimization of the processing of the loss of an acknowledgment message, when more than half of the overall sequence numbers N have been used (i.e., the threshold is equal to the integer part of Nmax/2) while a sent message 1-3 has still not received acknowledgment 4-6, the two most probable cases are congestion of the network 30 slowing the delivery of all messages 1-3 and of their respective acknowledgments 4-6; or a loss of an isolated acknowledgment.

The consequence is the suspension of new message transmission until the receipt of the acknowledgment of the oldest message for which no acknowledgment has been received by the source node 10.

In order to limit the impact of the effective loss of an acknowledgment on the performance of the system (insofar as resumption of traffic will not occur until after a retransmission of the message concerned following the detection of a timeout), an implicit acknowledgment is triggered. It consists of scanning the messages in the retransmission memory 11 for the associated double-chained list c1-c3 via the hash table at the destination node concerned. If a more recent sequenced message to said same destination node 21-23 has received an acknowledgment 4-6, this means that the oldest message has also been acknowledged, but that said acknowledgment is lost. A decision is made in this case to implicitly acknowledge it and the traffic can resume.

Furthermore, the retransmission memory 11 is used to manage the transport layer for the retransmission of messages, thus limiting the increase in memory space required.

In one embodiment, in order to increase the number of read and write ports of the retransmission memory 11, said memory is divided into a plurality of memory banks. For example, the transmission memory is divided into four memory banks, resulting in multiplying by four the number of available read and write ports. The distribution of messages over the different memory banks can be determined by a dependent hash function of the destination node 21-23 of the message 1-3.

It follows that, advantageously, the retransmission memory 11 can be used both for the application layer (sending end-of-message event) as well as for the transport layer (management of retransmissions) without impacting the performance of a node in terms of number of messages it can process per second.

In one embodiment, the sequencing of messages is only done for two virtual networks out of four. This makes it possible to divide by two the size of the retransmission memory 11 required for storing the end-to-end sequence numbers. Moreover, to limit the impact of the error correction code, the two sequence numbers (one per virtual network) are stored in the same entry and protected by a single error correction code. This enables an additional ten percent gain in memory without impacting the performance (no more than one sequence number for one of two virtual networks is necessary in each cycle).

Advantageously, the embodiments described above are applicable to any type of transmission protocol with acknowledgment, used between a source node of data and one or more destination nodes. Said transmission protocol can be in point-to-point mode, or in point-to-multipoint mode. By way of non-limiting examples, said transmission protocol with acknowledgment can be TCP (Transmission Control Protocol) or SCTP (Stream Control Transmission Protocol).

It should be noted that "node" throughout the description above is understood as any data source and/or destination element in an IP communications network such as a terminal, server or router. Moreover, a message designates here a packet or a data frame.

Advantageously, the embodiments described above enable a sequenced and reliable (i.e., without loss) delivery of data on several links while utilizing a minimum of resources, particularly in terms of memory space.

Advantageously, the different embodiments described above make it possible to optimize, in terms of resources and performance, flow control in a packet communication network.

The invention claimed is:

1. A method for managing end-to-end reliability in the delivery, with acknowledgment, of data from a source node to a group of destination nodes in a communications network, the group of destination nodes including at least one first destination node, said method comprising:
    marking, by the source node, messages transmitted from the source node to said first destination node by an incremental end-to-end sequence number;
    incrementing, by the source node and after transmission of a message from the source node to a destination node included in the group of destination nodes, an overall sequence number representing the position of said message in an overall sequenced flow of data sent by the source node to the group of destination nodes, wherein said overall sequence number is able to be incremented up to a predefined maximum value;
    identifying, by the source node, an overall sequence number of a message transmitted from the source node to a destination node included in the group of destination nodes and for which the source node has not received an acknowledgment;
    determining, by the source node, a difference between an overall sequence number of a next message to be transmitted from the source node to a destination node included in the group of destination nodes and the overall sequence number of the message for which the source node has not received an acknowledgment; and
    suspending, by the source node, transmission of messages from the source node to the group of destination nodes based on the difference being equal to a predefined threshold,
    wherein following said suspension, if an end-to-end sequence number marking a message received by said first destination node coming from said source node is different from said expected end-to-end sequence number, said first destination node determines that there is an error in the delivery of data.

2. The method according to claim 1, wherein, if the end-to-end sequence number marking the message received by said first destination node is higher than an expected end-to-end sequence number, the error is a lost message.

3. The method according to claim 1, wherein, if the end-to-end sequence number marking the message received by said first destination node is lower than an expected end-to-end sequence number, the error is that the message received is a duplicate message.

4. The method according to claim 1, wherein the predefined threshold is an integer value of one-half of said predefined maximum value.

5. The method according to claim 1, further comprising:
    initializing, by the source node, the overall sequence number based on the overall sequence number reaching the predefined maximum value.

6. The method according to claim 1, wherein the overall sequence number is coded on sixteen bits.

7. The method according to claim 1, wherein the end-to-end sequence number is coded on sixteen bits.

8. The method according to claim 1, further comprising:
    reading, by the source node, the end-to-end sequence number corresponding to said destination node,
    wherein said end-to-end number is stored in memory at said source node; and
    incrementing, by the source node, the end-to-end sequence number read from the memory by one.

9. The method according to claim 1, further comprising storing, by the source node, the overall sequence number in a retransmission memory; and storing, by the source node and in the retransmission memory, each message transmitted to said first destination node in a double-chained list,
wherein said double-chained list is stored in said retransmission memory and is associated with said first destination node.

10. The method according to claim 1, further comprising:
marking, by the source node, messages transmitted from the source node to a second destination node, of the group of destination nodes, by another incremental end-to-end sequence number that is different than the incremental end-to-end sequence number.

11. The method according to claim 1, wherein the incremental end-to-end sequence number identifies a position of the messages transmitted from the source node to said first destination node in a sequenced flow of data between the source node and said first destination node, and
wherein the overall sequence number identifies a position of the messages transmitted from the source node to said first destination node in relation to messages transmitted from the source node to other destination nodes of the group of destination nodes.

12. The method according to claim 1, further comprising:
storing, by the source node, a respective end-to-end sequence number for each destination node of the group of destination nodes.

13. A non-transitory computer-readable medium storing instructions, the instructions comprising:
one or more instructions that, when executed by one or more processors of a device, cause the one or more processors to perform the method according to claim 1.

14. A method, comprising:
transmitting, by a source node and to a first destination node of a set of destination nodes, a first message including a first end-to-end sequence number identifying a first position of the first message in a first flow of sequenced messages provided between the source node and the first destination node;
determining, by the source node, that an acknowledgment message is not received from the first destination node based on transmitting the first message to the first destination node;
determining, by the source node, a first overall sequence number associated with the first message that identifies a second position of the first message in relation to other messages transmitted from the source node to other destination nodes of the set of destination nodes based on determining that the acknowledgment message is not received;
determining, by the source node, a second overall sequence number associated with another message that is to be provided to a destination node of the set of destination nodes;
determining, by the source node, that a difference between the first overall sequence number and the second overall sequence number is greater than a threshold; and
suspending, by the source node, transmission of messages to the set of destination nodes based on determining that the difference between the first overall sequence number and the second overall sequence number is greater than the threshold to permit the set of destination nodes to identify an error associated with data delivery.

15. The method of claim 14, wherein the first end-to-end sequence number is different than the first overall sequence number.

16. The method of claim 14, further comprising:
storing, by the source node, the first message in a retransmission memory based on the first end-to-end sequence number to permit retransmission of the first message.

* * * * *